(12) United States Patent
Arezina et al.

(10) Patent No.: US 8,190,507 B2
(45) Date of Patent: May 29, 2012

(54) CASH-OUT METHODS AND SYSTEMS YIELDING ENHANCED TIME-DEFERRED VALUE

(75) Inventors: Vladimir I. Arezina, Chicago, IL (US); Mark B. Gagner, West Chicago, IL (US); Jeremy M. Hornik, Chicago, IL (US); Richard T. Schwartz, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 666 days.

(21) Appl. No.: 12/375,367

(22) PCT Filed: Jul. 30, 2007

(86) PCT No.: PCT/US2007/017027
§ 371 (c)(1),
(2), (4) Date: Jan. 27, 2009

(87) PCT Pub. No.: WO2008/016565
PCT Pub. Date: Feb. 7, 2008

(65) Prior Publication Data
US 2009/0327060 A1 Dec. 31, 2009

Related U.S. Application Data

(60) Provisional application No. 60/834,448, filed on Jul. 31, 2006.

(51) Int. Cl.
*G06Q 30/00* (2006.01)
(52) U.S. Cl. .......................................... 705/37; 705/26.3
(58) Field of Classification Search .................. 705/37, 705/26.3
See application file for complete search history.

(56) References Cited

U.S. PATENT DOCUMENTS

| 4,752,068 A | 6/1988 | Endo |
| 5,575,474 A | 11/1996 | Rossides |
| 5,609,525 A | 3/1997 | Ohno et al. |
| 5,833,537 A | 11/1998 | Barrie |
| 5,957,775 A | 9/1999 | Cherry |

(Continued)

FOREIGN PATENT DOCUMENTS

WO  WO 9929381  6/1999

(Continued)

OTHER PUBLICATIONS

International Written Opinion corresponding to PCT/US2007/017027, United States Patent Office, dated Mar. 13, 2008; 6 pages.

(Continued)

*Primary Examiner* — Lindsay M. Maguire
(74) *Attorney, Agent, or Firm* — Nixon Peabody LLP (57) ABSTRACT

A method of exchanging assets within a wagering establishment computer-based marketplace layer including the acts of accessing a wagering establishment marketplace layer using a peripheral device, offering a first asset for exchange in the wagering establishment marketplace layer to all participants in the wagering establishment marketplace layer. The method also includes the acts of receiving an offer to exchange a second asset for the first asset from an anonymous one of the participants in the wagering establishment marketplace layer, accepting the offer to exchange the second asset for the first asset from the anonymous one of the participants in the wagering establishment marketplace layer, and transferring the first asset in exchange for the second asset.

8 Claims, 7 Drawing Sheets

U.S. PATENT DOCUMENTS

| | | | |
|---|---|---|---|
| 6,004,211 A | 12/1999 | Brenner et al. | |
| 6,012,045 A | 1/2000 | Barzilai et al. | |
| 6,012,983 A | 1/2000 | Walker et al. | |
| 6,015,344 A | 1/2000 | Kelly et al. | |
| 6,068,553 A | 5/2000 | Parker | |
| 6,077,163 A | 6/2000 | Walker et al. | |
| 6,113,098 A | 9/2000 | Adams | |
| 6,165,071 A | 12/2000 | Weiss | |
| 6,234,896 B1 | 5/2001 | Walker et al. | |
| 6,254,481 B1 | 7/2001 | Jaffe | |
| 6,273,820 B1 | 8/2001 | Haste, III | |
| 6,302,790 B1 | 10/2001 | Brossard | |
| 6,311,976 B1 | 11/2001 | Yoseloff et al. | |
| 6,319,127 B1 | 11/2001 | Walker et al. | |
| 6,364,765 B1 | 4/2002 | Walker et al. | |
| 6,364,766 B1 | 4/2002 | Anderson et al. | |
| 6,365,765 B1 | 4/2002 | Baldwin et al. | |
| 6,386,975 B1 | 5/2002 | Peterson | |
| 6,431,983 B2 | 8/2002 | Acres | |
| 6,443,841 B1 | 9/2002 | Rossides | |
| 6,506,117 B2 | 1/2003 | DeMar | |
| 6,506,118 B1 | 1/2003 | Baerlocher et al. | |
| 6,663,489 B2 | 12/2003 | Baerlocher | |
| 6,722,981 B2 | 4/2004 | Kaminkow | |
| 6,722,985 B2 | 4/2004 | Criss-Puszkiewicz et al. | |
| 6,745,236 B1 | 6/2004 | Hawkins et al. | |
| 6,758,757 B2 | 7/2004 | Luciano, Jr. et al. | |
| 6,776,713 B2 | 8/2004 | Gauselmann | |
| 6,780,111 B2 | 8/2004 | Cannon et al. | |
| 6,800,027 B2 | 10/2004 | Giobbi et al. | |
| 6,811,486 B1 | 11/2004 | Luciano, Jr. | |
| 6,853,973 B2 * | 2/2005 | Mathews et al. | 705/18 |
| 6,923,721 B2 | 8/2005 | Luciano et al. | |
| 7,182,690 B2 | 2/2007 | Giobbi et al. | |
| 7,424,617 B2 | 9/2008 | Boyd et al. | |
| 2001/0024971 A1 | 9/2001 | Brossard | |
| 2002/0028708 A1 | 3/2002 | Busch et al. | |
| 2002/0039919 A1 | 4/2002 | Joshi et al. | |
| 2002/0077173 A1 | 6/2002 | Luciano et al. | |
| 2002/0077174 A1 | 6/2002 | Luciano et al. | |
| 2002/0093136 A1 | 7/2002 | Moody | |
| 2002/0094871 A1 | 7/2002 | Luciano, Jr. et al. | |
| 2002/0107065 A1 | 8/2002 | Rowe | |
| 2002/0151349 A1 | 10/2002 | Joshi | |
| 2002/0174020 A1 * | 11/2002 | Grey et al. | 705/26 |
| 2002/0196342 A1 | 12/2002 | Walker et al. | |
| 2003/0013515 A1 | 1/2003 | Rowe et al. | |
| 2003/0013531 A1 | 1/2003 | Rowe et al. | |
| 2003/0036422 A1 | 2/2003 | Baerlocher et al. | |
| 2003/0036427 A1 | 2/2003 | Brandstetter et al. | |
| 2003/0064794 A1 | 4/2003 | Mead et al. | |
| 2003/0078101 A1 | 4/2003 | Schneider et al. | |
| 2003/0100362 A1 | 5/2003 | Horniak et al. | |
| 2003/0104857 A1 * | 6/2003 | Jenkins | 463/17 |
| 2003/0106769 A1 | 6/2003 | Weiss | |
| 2003/0114219 A1 | 6/2003 | McClintic | |
| 2003/0119579 A1 | 6/2003 | Walker et al. | |
| 2003/0157979 A1 | 8/2003 | Cannon et al. | |
| 2003/0195024 A1 | 10/2003 | Slattery | |
| 2003/0211881 A1 | 11/2003 | Walker et al. | |
| 2004/0039695 A1 * | 2/2004 | Rowe | 705/39 |
| 2004/0053680 A1 | 3/2004 | Schultz | |
| 2004/0110554 A1 * | 6/2004 | Bromfield | 463/17 |
| 2004/0142742 A1 | 7/2004 | Schneider et al. | |
| 2004/0209662 A1 | 10/2004 | Wadleigh | |
| 2004/0243504 A1 * | 12/2004 | Asher et al. | 705/37 |
| 2005/0003886 A1 | 1/2005 | Englman et al. | |
| 2005/0159207 A1 | 7/2005 | Thomas | |
| 2006/0068893 A1 | 3/2006 | Jaffe et al. | |
| 2006/0079316 A1 | 4/2006 | Flemming et al. | |
| 2006/0079317 A1 | 4/2006 | Flemming et al. | |
| 2006/0084495 A1 | 4/2006 | Jaffe et al. | |
| 2006/0084496 A1 | 4/2006 | Jaffe et al. | |
| 2006/0089194 A1 | 4/2006 | Joshi et al. | |
| 2006/0100006 A1 * | 5/2006 | Mitchell et al. | 463/9 |
| 2006/0165060 A1 * | 7/2006 | Dua | 370/352 |
| 2007/0202951 A1 | 8/2007 | Bogosian et al. | |
| 2007/0254734 A1 | 11/2007 | Gilmore et al. | |
| 2007/0259706 A1 | 11/2007 | Anderson et al. | |
| 2007/0259713 A1 | 11/2007 | Fiden et al. | |
| 2007/0265060 A1 | 11/2007 | Hornik et al. | |
| 2007/0298856 A1 | 12/2007 | Gilmore et al. | |
| 2008/0113770 A1 | 5/2008 | Gelber et al. | |

FOREIGN PATENT DOCUMENTS

| | | |
|---|---|---|
| WO | WO 2005082480 | 9/2005 |
| WO | WO 2006002241 | 1/2006 |
| WO | WO 2006004831 | 1/2006 |
| WO | WO 2006004832 | 1/2006 |
| WO | WO 2006005073 | 1/2006 |
| WO | WO 2006017036 | 2/2006 |
| WO | WO 2006017067 | 2/2006 |
| WO | WO 2006017068 | 2/2006 |
| WO | WO 2006020811 | 2/2006 |
| WO | WO 2006026250 | 3/2006 |
| WO | WO 2006044252 | 4/2006 |
| WO | WO 2007103054 | 9/2007 |
| WO | WO 2008048634 | 4/2008 |

OTHER PUBLICATIONS

International Preliminary Report on Patentability corresponding to PCT/US2007/017027, United States Patent Office, dated Apr. 21, 2009; 9 pages.

* cited by examiner

CASH-OUT METHODS AND SYSTEMS YIELDING ENHANCED TIME-DEFERRED VALUE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games, and more particularly, to wagering game cash-out methods and systems therefor.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Conventionally, wagering games provide straightforward and simplistic cash-out methods and systems therefor. A need exists for improvements to such cash-out methods and systems. The present concepts are directed to satisfying at least this need.

SUMMARY OF THE INVENTION

According to one aspect of the present concepts, a method of exchanging assets within a wagering establishment computer-based marketplace layer including the acts of accessing a wagering establishment marketplace layer using a peripheral device, offering a first asset for exchange in the wagering establishment marketplace layer to all participants in the wagering establishment marketplace layer. The method also includes the acts of receiving an offer to exchange a second asset for the first asset from an anonymous one of the participants in the wagering establishment marketplace layer, accepting the offer to exchange the second asset for the first asset from the anonymous one of the participants in the wagering establishment marketplace layer, and transferring the first asset in exchange for the second asset.

According to another aspect of the present concepts, a method of linking a peripheral device to a wagering establishment computer-based marketplace layer includes the acts of establishing a communication link between a plurality of participants in a wagering establishment marketplace layer, the participants being anonymous to one another, and accessing a first marketplace layer account associated with a first participant. The method also includes offering a first asset associated with the first marketplace layer account for exchange, subject to at least one exchange condition, to all participants on the marketplace layer, receiving all offers presented by the participants offering an asset in exchange for the first asset, and presenting to the first participant all offers received by the participants offering an asset in exchange for the first asset.

According to still another aspect of the present concepts, a computer-based wagering establishment marketplace system includes a computer network comprising an instruction set defining a marketplace layer and a plurality of peripheral devices connected to the network, the peripherals being configured to permit participants having a marketplace layer account to enter the marketplace layer. The instruction set defining the marketplace layer is configured, upon execution, to enable multi-party communication in the marketplace layer, and in relation to communications between any participants therein, to display each participant's anonymous participant ID and associated status score. The instruction set defining the marketplace layer is also configured, upon execution, to facilitate at least one of exchange, sale, and auction of assets between any of the participants, the marketplace layer further comprising an instruction set to facilitate, in connection with a transaction between participants in the marketplace layer, association of a first asset in a first marketplace layer account with a second marketplace layer account and association of a second asset in the second marketplace layer account with the first marketplace layer account.

According to yet another aspect of the present concepts, a method of incentivizing deposit of funds associated with a wagering account is provided which includes transferring funds associated with a wagering account to an interest bearing account associated with a player and/or an identification number assigned to the player, accruing interest comprising a monetary interest and/or a non-monetary interest in association with the funds, and awarding the interest to the player subject to at least one redemption condition.

In another aspect, a method of exchanging assets within a computer-based marketplace layer comprises the acts of accessing a marketplace layer using a peripheral device, offering a first asset for exchange in the marketplace layer, accepting an offer to exchange said first asset with a second asset offered in the marketplace layer, and transferring the first asset in exchange for the second asset.

In yet another aspect, a method of linking a peripheral device to a computer-based marketplace layer, comprises the acts of establishing a communication link between a participant's peripheral device and a server associated with the marketplace layer, accessing a marketplace layer account associated with the participant, communicating a signal to the server representing the asset, associating an asset with the marketplace layer account associated with the participant, offering the asset for exchange, subject to at least one exchange condition, on the marketplace layer, and transferring the asset to another participant satisfying the exchange condition(s) in exchange for agreed upon consideration between the participant and the another participant.

According to another aspect of the present concepts, a computer-based marketplace system includes a computer network comprising an instruction set defining a marketplace layer and a plurality of peripheral devices connected to the network, each of the plurality of peripheral devices being associated, at least temporarily, with a participant and each of the participants being associated with a marketplace layer account. In this system, the instruction set defining the marketplace layer is configured to, upon execution, enable multi-party communication in the marketplace layer and to facilitate exchange, sale, and/or auction of assets between the participants. The marketplace layer further includes an instruction set to facilitate, in connection with a transaction between participants in the marketplace layer, association of a first asset in a first marketplace layer account with a second marketplace layer account and association of a second asset in the second marketplace layer account with the first marketplace layer account.

Additional aspects of the present concepts will be apparent to those of ordinary skill in the art in view of the detailed description of various embodiments, which is made with reference to the drawings, a brief description of which is provided below.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1A:
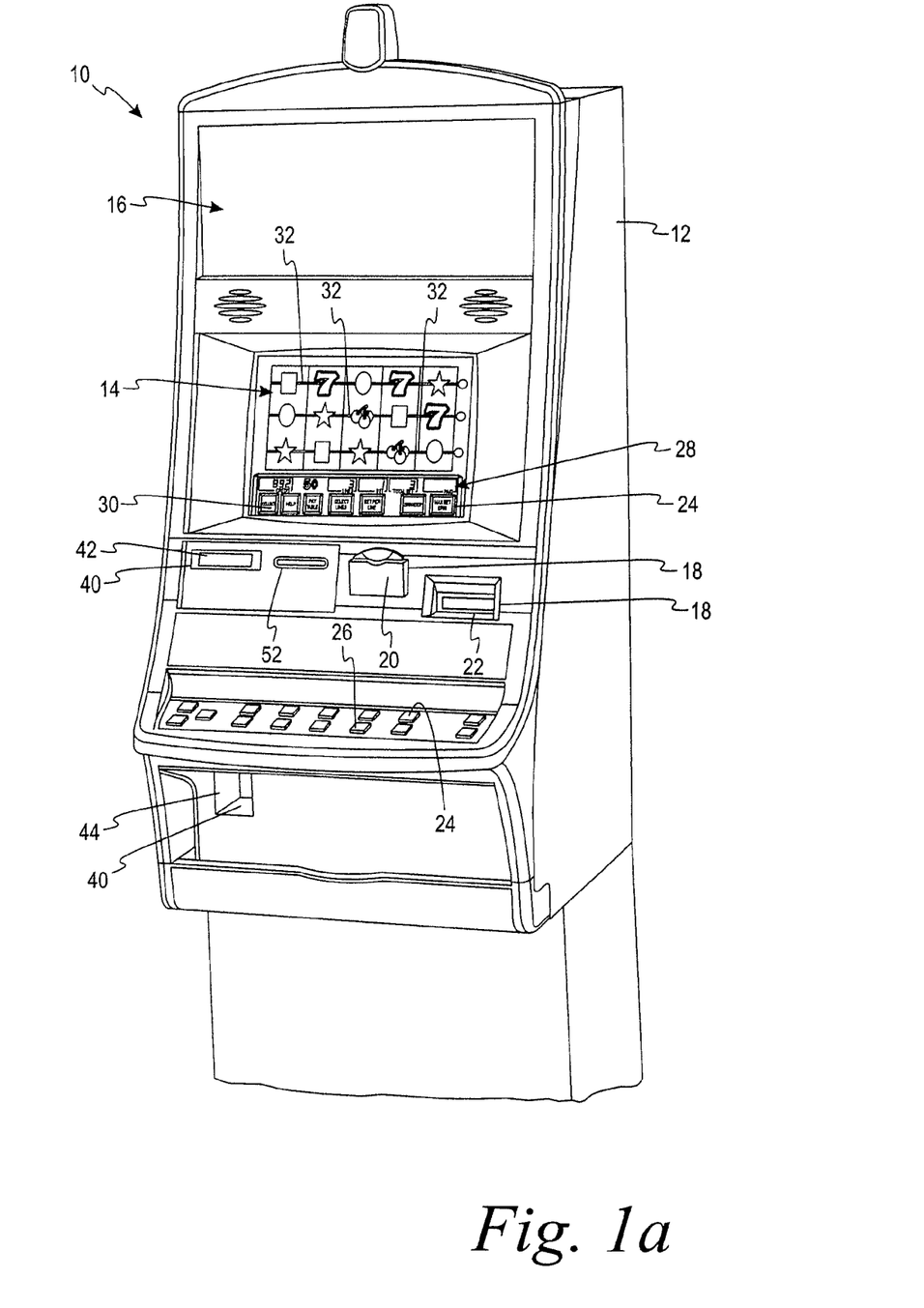
FIG. 1a is a perspective view of a free standing gaming machine embodying the present invention.

Referring to FIG. 1a, a gaming machine 10 is used in gaming establishments or wagering establishments, such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1a). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1a, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1a as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the wagering establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
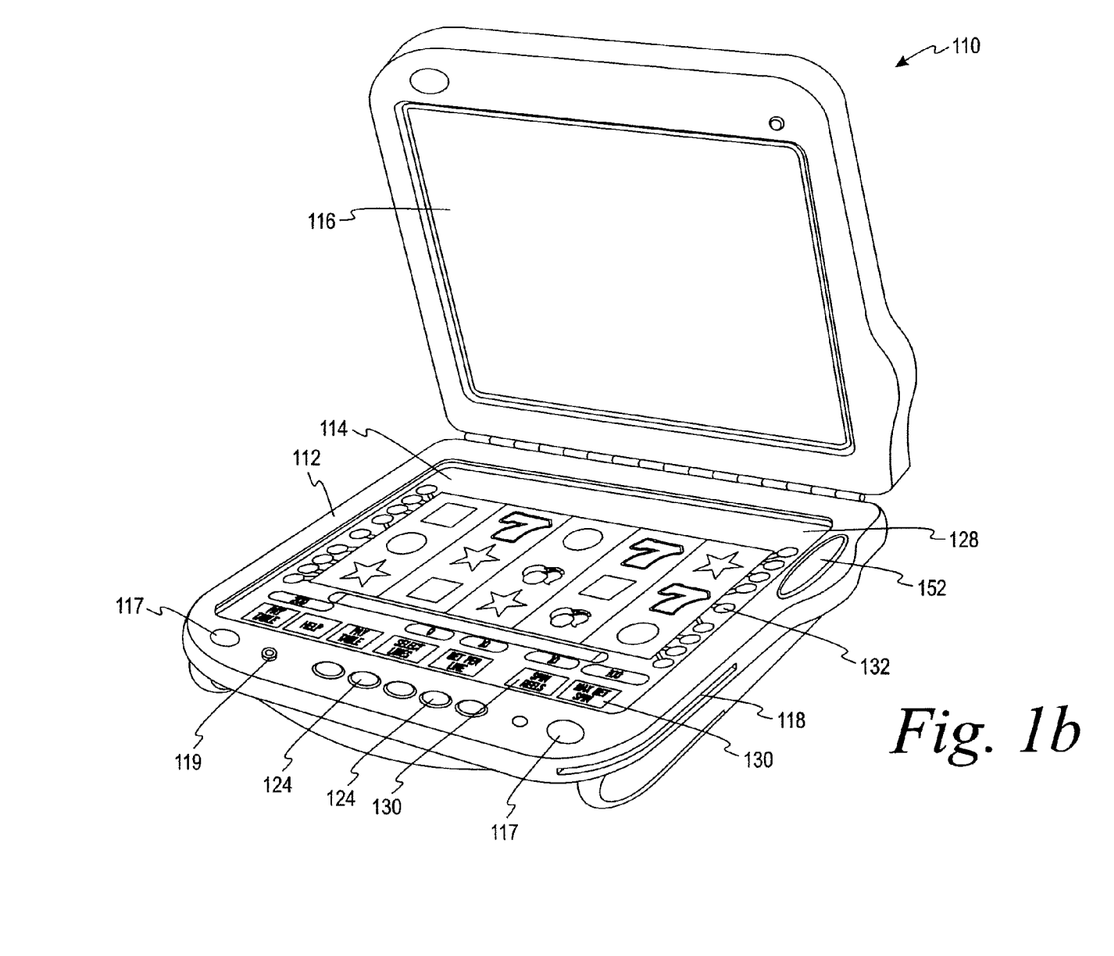
FIG. 1b is a perspective view of a handheld gaming machine embodying the present invention.

Depicted in FIG. 1b is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, either or both of which may comprise a touch screen display 128, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1b, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display 128 (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds.

In another aspect, the value input device 118 may be provided remotely from the handheld gaming machine 110.

The player input device 124 comprises a plurality of push buttons 126 on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1b, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 10. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1, comprises a biometric sensing device.

Figure 2:
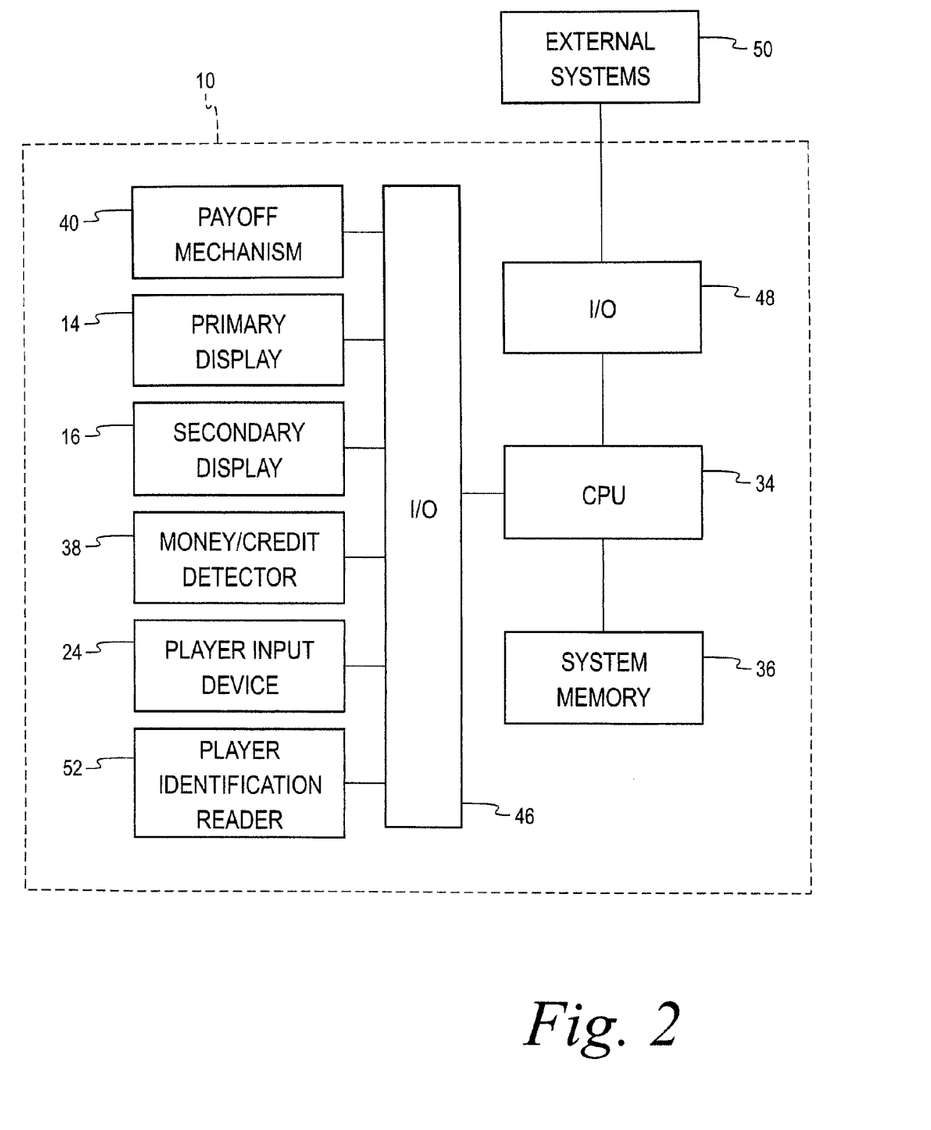
FIG. 2 is a block diagram of a control system suitable for operating the gaming machines of FIGS. 1a and 1b.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal digital assistant (PDA), a counter top or bar top gaming machine, or other personal electronic device such as a portable television, MP3 player, entertainment device, etc.

Figure 3A:
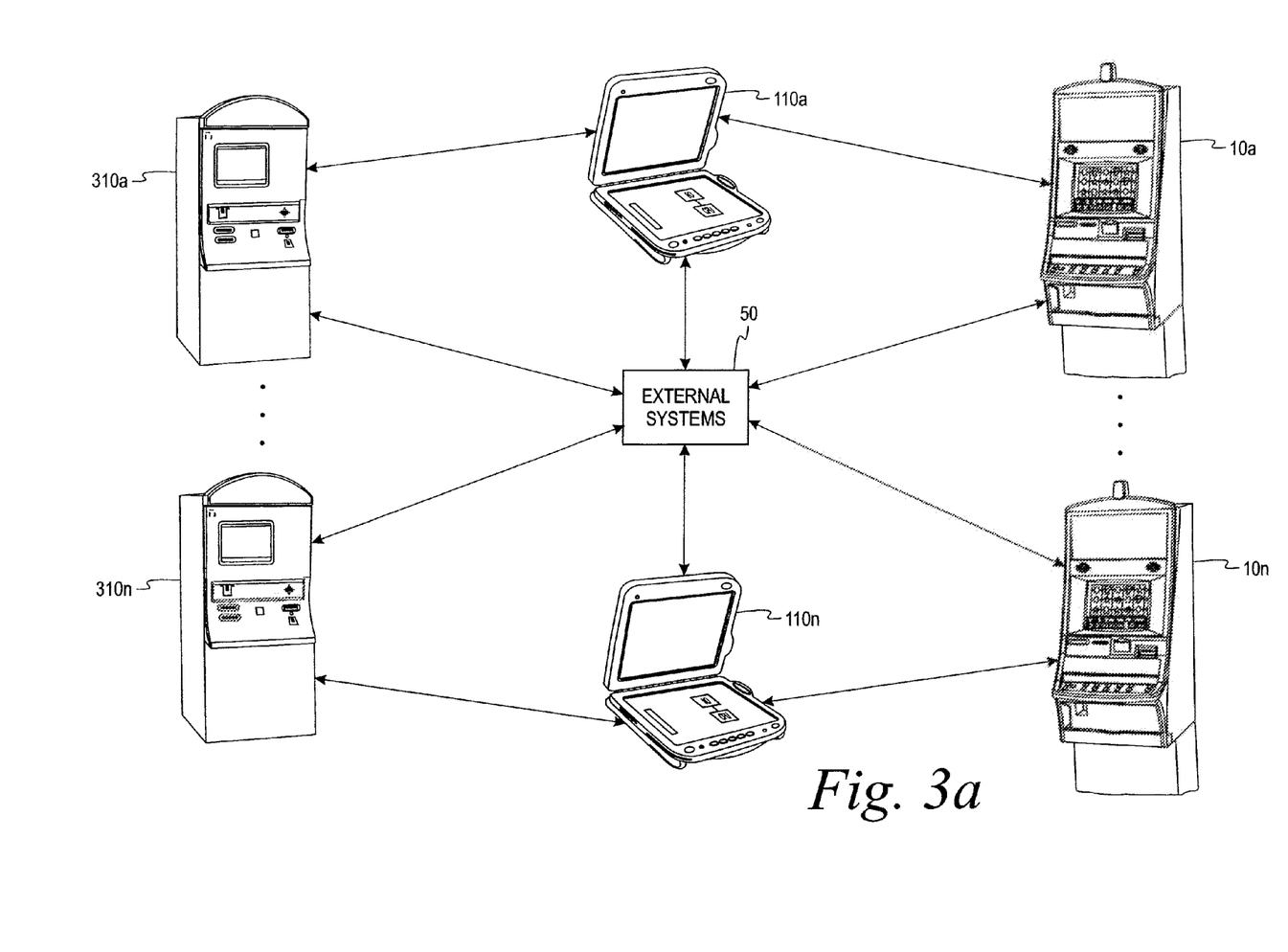
FIGS. 3a-b are functional diagrams of network arrangements according to at least some aspects of the present concepts.
Figure 3B:
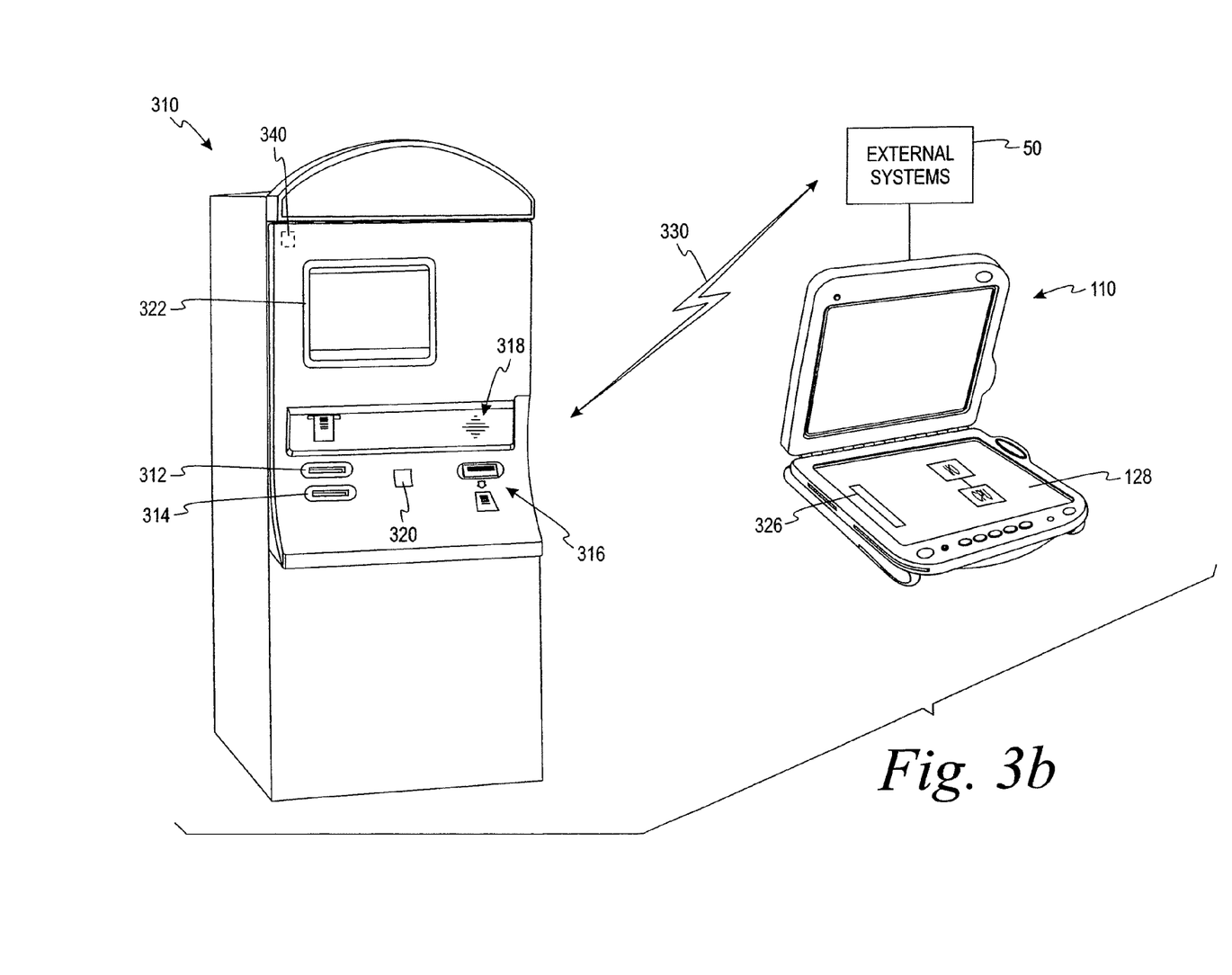

In accord with the concepts disclosed herein, a variety of cash-out methods and systems and provided, optionally yielding enhanced time-deferred value. These cash-out methods and systems are available for use in combination with handheld gaming devices 110 and upright gaming machines 10, as described above, as well as player-accessible kiosks disposed within the wagering establishment. FIG. 3a depicts a cash-out system utilizing a plurality of handheld gaming machines 110a-n in communication with an external system 50 (e.g., a server) plurality of upright gaming machines 10a-n, and a plurality of kiosks 310a-n. As shown in the example of FIG. 3b, the server 50 communicates with the handheld gaming machine 110 via a wireless communication link 331 directly or through an intermediary link and communicates with a kiosk 310 via a wireless communication link 330 directly or through an intermediary link. Hardwired connections may alternatively be used. The term "server" as used herein encompasses one or more server computers such as a server farm and encompasses server platforms as well as application servers. The handheld gaming machine 110 includes a communication interface 326, which may be part of or separate from the I/O circuit 48. The communication interface 326 enables communication via the communication link 330. The communication link may utilize any convention wired or wireless protocol, including Ethernet, 802.11, Bluetooth, USB, cellular (CDMA, GSM, and the like), and so forth. Thus, the communication interfaces 304, 326 may include wireless transceivers, USB controllers, Ethernet controllers, RFID transceivers or transponders, and the like, for example.

The external systems 50 are utilized, in at least some aspects of embodiments according to the present invention, to facilitate communication between peripheral devices, such as gaming machines (10a-n, 110a-n) and/or other connected systems (e.g., kiosks 310a-n) or remote computers. The external systems 50 permit linkage of such peripheral devices to a marketplace layer or application in which a player's assets may be bought, sold, saved, auctioned, valued, exchanged and/or bartered. The marketplace layer is an exchange environment configured to facilitate exchange of tangible, intangible, or virtual (e.g., on-line gaming environment-based) assets and/or information and which may comprise one or more sub-layers. For example, the marketplace layer may comprise a trading layer wherein participants in the marketplace layer (e.g., buyers and sellers) are matched together, a clearing layer wherein the asset transfer requirements and the transaction obligations are resolved, and a settlement layer wherein the asset is delivered to the receiving party in exchange for the consideration due. The marketplace layer may permit access to users from, for example, a single venue (e.g., access points in a single wagering establishment), across multiple venues (e.g., access points in a plurality of linked wagering establishments), across a wide area network (e.g., access points in a city-wide network), or on an internet-accessible web-site.

As shown in FIG. 3b, the kiosk or funding terminal 310 is a floor-standing device that includes a bill validator/acceptor 312, a credit/debit card acceptor 314, a ticket/cash dispenser 316, a speaker or speakers 318, a sensor 320 (such as an IR sensor or a biometric sensor for sensing a biometric such as a fingerprint, a retina, or a voice pattern), a display 322, and a communication interface 340. One purpose of the kiosk 310 is to accept cash or cash equivalents from a player and to transfer those associated funds (either as perceived or in reality) to a designated marketplace layer account or to a marketplace layer account opened contemporaneously with the deposit of funds in the kiosk. According to at least some aspects of the present concepts, an account holder of a marketplace layer account may add funds to their marketplace layer account by inserting currency or coded tickets (e.g., barcoded tickets) into the bill acceptor 312 in the kiosk 310 and/or by inserting a card (e.g., a credit card, debit card, smart card, stored value card, etc.) into card acceptor 314. The ticket/cash dispenser 316 can dispense, for example, a barcoded ticket or other negotiable instrument 350 having one or more barcodes 352, 354 or encrypted transaction codes or transaction information imprinted thereon, which represent an amount of associated funds, marketplace layer account identifier, and the like. Barcodes 352, 354 optionally comprise encrypted information. Such a negotiable instrument is useful as a trackable currency substitute.

Also shown in FIG. 3b, the handheld gaming machine 110 optionally includes a sensor 324 configured as a barcode scanner to scan a barcode(s) 352, 354 on a barcoded ticket 350. Upon validation of the barcode(s) bearing transaction related information, the handheld gaming machine 110 can automatically consummate a transaction between the ticket holder and the player in possession of the handheld gaming machine. Thus, the player's asset associated with the transaction is substantially immediately transferred to the marketplace layer account of the bearer, or other designated recipient address (e.g., a handheld gaming machine 110 associated with the ticket bearer) and the funds deposited by the ticket bearer are then substantially immediately transferred by the kiosk 310 or external systems 50 to the marketplace layer account of the player. Thus, the kiosk may output transaction identification information configured to validate or broker a transaction between participants in the marketplace layer. Other measures may also be taken by the wagering establishment to broker transactions to ensure the viability and integrity of the marketplace layer transactions including, but not limited to, implementation of verification steps to ensure an identity of the parties engaged in a prospective transaction and holding transfer of any assets therebetween until completion of such verification. In this regard, sensor 320 may comprise a biometric sensor configured to authenticate an account holder of a marketplace layer account (e.g., against a known template for the player) before permitting the account holder to complete a transaction or a selected portion of a transaction. Similarly, the handheld gaming machine 110 may optionally comprise or be functionally associated with a biometric sensor configured to authenticate an account holder of a marketplace layer account before permitting the account holder to complete a transaction or a selected portion of a transaction Before a player can offer the player's assets for sale, storage, auction, valuation, exchange, and/or barter on the marketplace layer, or before a player can buy others assets on such marketplace layer, the player must establish or have established a marketplace layer account. In at least some aspects, each participant's identity is advantageously verified prior to the assigning of an account to a player so as to ensure, as best possible, the security and integrity of the marketplace layer. In at least some other aspects, the marketplace layer may be advantageously configured to include multiple environments, each environment having certain characteristic types of transactions and/or levels of security.

For example, one environment may simply comprise a bulletin board in which any anonymous player or any anonymous person having access to the system may post an asset together with contact information. An interested party may then independently contact such anonymous player or any anonymous person outside of the marketplace layer and arrange for a transfer of assets.

To illustrate, a player may receive as an asset (e.g., a comp) a pair of tickets to a performance at the wagering establishment. The player does not care to see the performance and would rather have money or some other asset instead of the tickets. In accord with the present concepts, the player is permitted to access a marketplace layer through a handheld gaming machine 110 or other peripheral device and anonymously posts on a bulletin board environment that he or she has tickets to the performance and will meet any interested parties at a specified place in the wagering establishment at a specified time or range of times. The player could elect to sell the tickets to the first party to arrive at the specified place within the designate time, award the tickets to the highest bidder of present parties, or the like. In such scenarios, the marketplace layer does not verify the identity of the player or monitor or guarantee the transactions. Alternatively, since the asset is a good which is controlled by the wagering establishment, the consummation of the transaction could be handled electronically by the wagering establishment, wherein the ticket holders ticket information is entered by the ticket holder and the ticket is cancelled electronically (i.e., invalidated) by the wagering establishment and a new ticket is issued to the recipient (e.g., purchaser, bidder, etc.). The wagering establishment would then provide options to the recipient as to a desired method of receiving the ticket. For example, the recipient could obtain an e-ticket, pick up the ticket at the ticket window or customer service window upon a suitable, showing of proof of purchase (e.g., information relating to the transaction, such as a transaction ID or photo identification), pick up the ticket at a kiosk 310 (e.g., by inserting into a kiosk a credit card, smart card, or debit card associated with the recipient's marketplace layer account, responsive to which a ticket is printed).

As noted above, however, it is desirable to verify each participant's identity and to assign each participant in the marketplace layer, or selected sub-portions thereof, a participant status score indicative of the player's credentials and verified information to establish and maintain the integrity of the marketplace layer. In various examples, a player's marketplace layer account is linked to the player's wagering establishment account (e.g., a player's club account) in which the player's identity and other information (e.g., home address, credit information, etc.) are known or the marketplace layer account is established in connection with the checking out of a handheld gaming machine 110. In the latter example, the player's identification and credit information are required to be verified in connection with the checking out of a handheld gaming machine 110 and such information is readily available to associate with a marketplace layer account. Although the participant's personal information is known to the wagering establishment or other entity controlling the marketplace layer, the participants are advantageously represented within the marketplace layer by a participant ID. In one aspect, the participant ID comprises an assigned or participant-selected ID that remains fixed over a period of time. In another aspect, the participant ID is a randomly assigned identification (e.g., number, character string, alphanumeric string, etc.) assigned on a per-transaction basis. Whatever the form of the participant ID, the aforementioned status score is preferably related thereto and displayed to other participants in the marketplace layer.

Alternatively, a person may simply apply for a marketplace layer account through a designated intermediary such as a wagering establishment website or a wagering establishment employee or office. Information advantageously utilized to verify each participant's identity includes, but is not limited to, any combination of biometric characteristic, physical attribute or characteristic (e.g., photograph or height/weight/hair color/eye color information on government issued identification), driver's license number, passport number, credit card information (e.g., credit card number, issuing entity, name on card, expiration date, CVV/CVC code, etc.), credit card billing address information, bank account information (e.g., name of bank, routing number, account number, account holder, etc.), home address, employer name, employer address, social security number, home telephone number, and/or email address. Prior to activating the player's marketplace layer account, at least some of the above-noted information is verified.

Moreover, various degrees of verification may also be provided. For example, a low level of verification (e.g., Level 1 or "silver") may comprise only a verification of a credit card number, CVV/CVC code, and billing address. A higher level of verification (e.g., Level 2 or "gold") may also require a valid email address, to which a confirmatory email is sent. A still higher level of verification (e.g., Level 3 or "platinum") may further include a review of a government issued identification (e.g., driver's license or passport) by a designated wagering establishment employee. Higher levels of verification may add additional factors, such as those noted above. Although certain information has been noted above in relation to a verification hierarchy, this example verification hierarchy is merely an example and any desired information or combinations of information are available to formulate a desired verification hierarchy In accord with such a verification hierarchy, each participant's verification level or status is preferably, but not necessarily, revealed to other participants, even where the participant's actual identities are not revealed. Each participant can thus use the verification level or status of the other participant in a potential transaction as a measure of the potential risk. In other words, higher verification levels should correspond to a lower level of risk. Additionally or alternatively, a participant's history of transactions, if a history is available, is revealed to other participants and, following each transaction, participants are permitted to provide any positive and/or negative feedback on the transaction. Thus, participants in the marketplace layer may duly consider a participant's verification level or status, as well as the participant's history of transactions (if any) and feedback relating thereto.

The marketplace layer account, in turn, may be optionally associated with an outside accounting system such as, but not limited to, a bank account (e.g., associated with an ATM check card) or a non-bank account. Non-bank accounts comprise, for example, third-party service providers (outside accounting services) such as, but not limited to, a PayPal® account, a Firepay account, a Netteller account, and automatic clearing houses (ACHs). Thus, for example, a player or another person may, through transactions in the marketplace layer, add value to the player's marketplace layer account. When desired, the player may cash-out his or her marketplace layer account by associating the player's marketplace layer account to an outside account (e.g., a bank account, a PayPal® account, a Firepay account, a Netteller account, etc.) and transferring the value of currency therein from the player's marketplace layer account into the outside account. Alternatively, as discussed below, the wagering establishment may provide incentives for a player or participant in the marketplace layer having funds stored in association therewith to leave the funds in the wagering establishment marketplace layer.

In general, funds transfers of a participant's assets to (or from) a bank account or non-bank account merely requires the participant to provide the appropriate routing information for the recipient account, which may be participant's own account or the account of another (e.g., a spouse's account, an account of the participant's child, a merchant's account, etc.). This information may be provided by the participant at any time, upon signing up for a marketplace layer account or after establishing such account. The participant may initially store information on a variety of different accounts and select from this variety of accounts, such as by inputs to a touch screen display 128 on a handheld gaming machine 110, when designating a desired account to which the funds are to be transferred. FIG. 3b, for example, shows a handheld gaming machine 110 in wireless communication with an external system 50, which is in turn in communication with another peripheral device, a kiosk 310.

Figure 4:
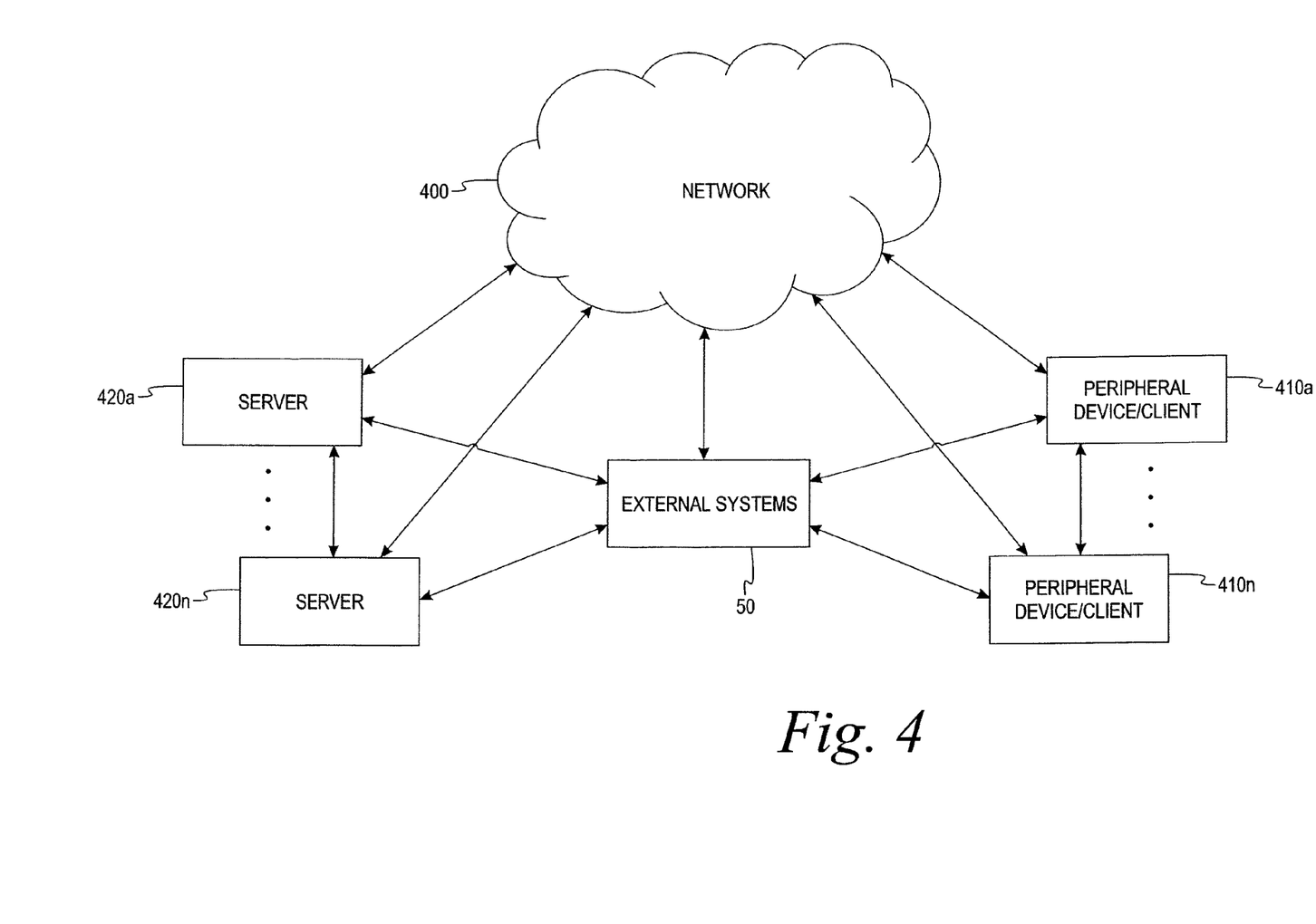
FIG. 4 is a functional diagram of another network arrangement according to at least some aspects of the present concepts.

In the aspect illustrated in FIG. 4, external systems 50 are connected to a network associated with servers 410a-n, or the like, bearing the marketplace layer and the participant's marketplace layer accounts. The potential accounts to which the external system 50 is connected or could be connected includes a server (e.g., 420c, not shown) at a financial institution, a server (e.g., 420d, not shown) at a credit card company, and an ACH network server (e.g., 420e, not shown). When a transaction has been completed in an external systems 50 centric architecture, transaction information is communicated from the external systems 50 to the associated account and the participant's marketplace layer account is debited (or credited) accordingly. A participant may also transfer funds from such bank account or non-bank account into the participant's marketplace layer account to enable increased purchasing power within the marketplace layer. As previously noted, the marketplace layer is accessible via a computer, a kiosk 310, a handheld gaming machine 110, an upright gaming machine 10, and/or through other funds transfer devices (e.g., a portable telephone, a PDA, and other portable electronic devices).

Although the funds associated with the participant's marketplace layer account may comprise a transfer of the value of the funds to an account, such as noted above, the value may be transferred to other forms bearing value. For example, the value of the funds may be transferred to a portable data unit carried by the player (e.g., an electronic storage device, a portable telephone, etc.), a smart card, a stored value card, a check, an equivalent in tokens, a cash equivalent, or the like. For example, in at least some aspects, a kiosk 310 is configurable to provide a participant in the marketplace layer to cash out using any desired form of value output including any individual form of value output noted above or combination thereof.

To reiterate, a player on a handheld gaming device 110, or other device, is permitted to conduct transactions in a marketplace layer once an account has been established for the player. A player or other person is optionally permitted to browse the marketplace layer or on selected sub-layers, with restrictions (e.g., no transactions), without an account. The assets which may be bartered for in the marketplace layer could comprise any asset, including services or potentials for assets (e.g., intermediary stages of game play or an unrealized potential), which may be legally bought, sold, auctioned, valued, exchanged, bartered, or the like. For example, player one may pause a 5-reel game after the outcomes on four of the five reels has been revealed and a three reel winning outcome (50 credits) is evident. In this hypothetical example, a variety of potential outcomes in the fifth reel could produce a winning outcome of 50 credits (65% chance), 75 credits (25% chance), 100 credits (8% chance), or 150 credits (2% chance). Player one may auction off the stored state of the game for continued play by player two. Player one may thus forgo the potential (35% chance) for greater awards for a fixed amount (e.g., 60 credits) offered by the player two. Player one thus obtains an increase in winnings, an extra 10 credits, beyond the probable outcome (65% chance) that player one would have only received 50 credits. The auction may be conducted directly by the player, such as is commonly done on eBay, or may be conducted on the player's behalf (e.g., by the wagering establishment or third party).

As another example, a player may have won 10 free spins on a game, but does not want to, or is unable to, take advantage of the opportunity. The player may place the 10 free spins "on sale" in the marketplace layer, such as by a posting of "10 free spins on Game X for $8" or "10 free spins on Game X to the highest bidder." The 10 free spins would, upon consummation of the transaction (e.g., receipt of consideration) would then be associated with the recipient's (e.g., the buyer's or highest bidder's) marketplace layer account. The recipient could then immediately carry out on the 10 free spins on his or her handheld gaming machine 110, gaming machine 10, or kiosk 310 or simply save the asset for later execution or even for later sale or exchange with another participant in the marketplace layer.

Participants may further place a standing order in the marketplace layer. For example, a participant may simply post that they will "buy 'X' for '$Y'" or that they are "willing to negotiate for tickets to Saturday night 8:00 P.M. performance of O." A player may, for example, put up a "for sale" ad for unused credits and/or eligibility and/or other game-related benefits.

Players are thus empowered to barter game-related or non-game related assets, benefits, services and/or potentials therefore to try to hit the right demographic at the right time in the right place.

In accord with other aspects of the present concepts, players are permitted to cash out by receiving non-cash consideration. For example, a player inputting a request to cash out to a gaming machine 10, handheld gaming machine 110, kiosk 310, or the like, can convert their cash or credits directly to airline miles with a carrier of their choice or to an equivalent dollar value, or a multiple thereof, in points on a card of the player's choice or on a selected card from a displayed plurality of cards. For example, a player having $175 may elect to receive cash or an electronic funds transfer of the value of the cash or credits to an account designated by the player (e.g., a Las Vegas Bank CD, a PayPal account, an interest-bearing bank account, etc.), a specified or equivalent value in miles on United Airlines (e.g., 10,000 miles on the player's frequent flyer program), or a specified or equivalent value in points on the player's credit card.

Although such transfers and options may be affected directly, such transfers and options may be achieved indirectly through a wagering establishment points program, wherein a player may convert asserts into points, such as by using the available assets and any optional additional assets to purchase points in the wagering establishment points program. These points may then be redeemed by the player at any time or may be transferred, if desired, to or redeemed in connection with another points programs. Thus, for example, a player may covert their $175 residual value into an associated number of points in the wagering establishment's points program, which may then be redeemed by a player at a later time through an appropriate wagering establishment store (e.g., to redeem for merchandise), service, activity, bill, or the like, or transferred to a points program of an affiliate of the wagering establishment or to an unrelated points program, such as through an intermediary service. As an incentive to utilize the wagering establishment's points program, the amount of funds converted by the player may converted into a greater equivalent value in points. For example, the $175 residual value could be converted into the equivalent of $200 in the wagering establishment's points program. Thus, in this example, rather than giving $175 directly to the player, the wagering establishment provides the player with $200 that may be used in the wagering establishment and/or affiliated entities. Likewise, the wagering establishment may facilitate conversion of a player's frequent flyer miles, points on a card, or the like, into a cash equivalent for use by the player on the player's handheld gaming machine 110 (e.g., converting 10,000 miles on a frequent flyer account into a cash value).

Moreover, in accord with at least some aspects of the present concepts, the player is further enabled to barter their non-cash equity (e.g., a ticket to a sold-out "O" show) in exchange for cash to fund, for example, continued game-related or non-game-related use of the player's handheld gaming machine 110. Thus, a player may be offered a comp or award by the wagering establishment and the player may instead opt for, or indicate a preference for, a cash value substitute. For example, in lieu of a ticket to a sold-out "O" show, the player may opt for and receive a face value of a ticket that the player would have otherwise been issued.

Still further, in accord with other aspects of the present concepts, the wagering establishment may generate and maintain a "comp economy" for unused or unwanted comps, such as in the marketplace layer or in another layer, application, computer-based venue, and/or a non-computer-based venue (e.g., a customer service desk or office, channel on wagering establishment in room and wagering establishment TVs). The wagering establishment can thus offer a variety of alternative comps of a greater value, lesser value, and/or comparable value for selection by the player. A player may accordingly opt for dinner for two at a wagering establishment restaurant in lieu of a single ticket to a show. In the comp economy, any unclaimed comp, benefit, or residual value can be transferred to another player by the wagering establishment (e.g., as a comp or award) or auctioned by the wagering establishment to another player. For example, a comp (e.g., a ticket to a sold-out "O" show) may have associated therewith a predetermined expiration period (e.g., the ticket must be picked up in person at least 30 minutes before the show). If the player has not redeemed the comp, such as by picked up a ticket a predetermined time before showtime, the wagering establishment may immediately put the ticket up for auction. In this manner, the wagering establishment may optimally utilize unclaimed comps or assets.

In another example, if a handheld gaming machine 110 is returned with residual funds or other assets thereon, the wagering establishment, if unable to reasonably return the money or assets to the player, is permitted via the comp economy and/or marketplace layer to auction off the residual value right to use the handheld gaming machine with the remaining funds for a fraction of a dollar per dollar. In one example, the assets may comprise game-related assets, such as assets collected in a treasure hunt game (e.g., 7 out of 10 objects have been found) or a character's assets in an adventure-type game (e.g., in a fantasy character-based game, a player's character may have been awarded a special sword, staff, or object that conveys certain benefits, such as improved odds and/or enhanced awards). A player, unable to complete a treasure hunt or continue a fantasy-quest game and unwilling to devote any time or effort to receiving consideration therefore in the marketplace layer for such assets, may return the handheld gaming machine 110 with such assets stored thereon. In lieu of simply canceling such assets, the wagering establishment may auction off such assets or may permit players to select such asset-rich handheld gaming machine 110 for an additional fee. In this regard, the present concepts further permit a player to check-out an as set-rich handheld gaming machine 110 enabled by the wagering establishment (i.e., independent of a prior player's wagering game play) for a fee determined by the wagering establishment. Thus, a time-limited player may want to pay a fee up-front to automatically bypass certain introductory levels to go straight to a level of interest (e.g., where the awards are larger, the odds are more favorable, and/or the games more interesting to the player).

Figure 5:
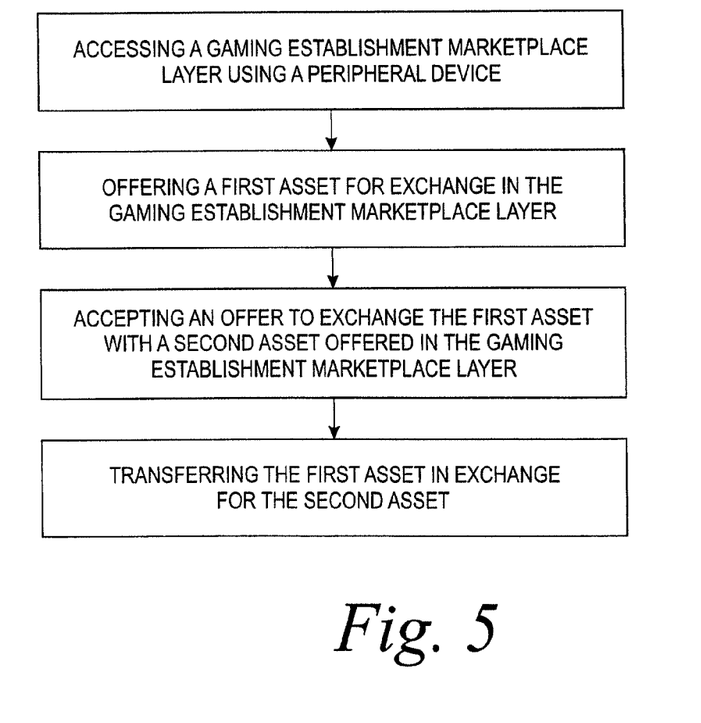
FIG. 5 is a flowchart of a method according to at least some aspects of the present concepts.

Thus, in accord with at least some aspects of the present concepts, noted above, a method of exchanging assets within a wagering establishment computer-based marketplace layer includes, as shown in FIG. 5, the acts of accessing a wagering establishment marketplace layer using a peripheral device (e.g., 10, 110, 310, etc.) in step S500 and offering a first asset for exchange in the wagering establishment marketplace layer in step S510. The method also includes accepting an offer to exchange the first asset with a second asset offered in the wagering establishment marketplace layer (step S520) and transferring the first asset in exchange for the second asset (step S530).

In another aspect, a method of linking a peripheral device to a wagering establishment computer-based marketplace layer comprises the steps of establishing a communication link between a participant's peripheral device (e.g., 10, 110, 310, etc.) and a server (e.g., 420a-n) associated with the wagering establishment marketplace layer, accessing a marketplace layer account associated with the participant, and communicating a signal to the server representing the asset. The method further includes the steps of associating an asset with the marketplace layer account associated with the participant and offering the asset for exchange, subject to at least one exchange condition, on the marketplace layer. Finally, this aspect includes the step of transferring the asset to another participant satisfying the exchange condition(s) in exchange for agreed upon consideration, which may comprise any between the participants.

Still other options for cash-out available to players in accord with the present concepts include depositing the funds in an interest-bearing account. Credits may optionally be rounded to nearest cash value and credited to a wagering account set up for the player. The "interest-bearing" account is, in at least one embodiment, managed, owned, or affiliated with the wagering establishment. As used herein, the term "interest" refers to both monetary and non-monetary assets, awards, and benefits provided to a player or patron of the wagering establishment or affiliate by the wagering establishment or affiliate in exchange for maintaining funds in an account with the wagering establishment or affiliate.

Numerous variations on this general concept may also be implemented to tailor the opportunity to better suit the player's interests, wagering establishment's interests, and/or compromises therebetween. For example, the "interest" can be a pre-determined cash-value comp if the player returns within a pre-determined period of time (e.g., a day, a week, two weeks, a month, a year, 5 years, etc.) to the wagering establishment. This cash-value may vary in accord with variables such as, but not limited to, the period of time the amount of funds deposited with the wagering establishment or affiliated entity, the player's time of play within the wagering establishment, and/or the amount wagered by the player within the wagering establishment during a predetermined period of time (i.e., the player's history). A cash-value comp schedule or matrix may be used to inform a player of the time-value of the depositing of the player's funds (e.g., $250 left for 7 days can be redeemed for $260). Moreover, the accrual of "interest" itself is optionally contingent upon factors such as a minimum balance in the account and/or a minimum period of time for which such minimum balance must be maintained.

Restrictions on redemption are optionally imposed including, but not limited to, in-person redemption at the wagering establishment. Other restrictions on redemption could include, but are not limited to, a player's continued play, on a separate occasion, for a pre-determined minimum amount of time. For example, a player could be required to return to the wagering establishment and play wagering games for at least two hours to receive the aforementioned interest comp, although the player's initial balance would always be immediately available to the player at any time. Player's may also receive the interest comp, whether a monetary or other form of compensation, in a tiered manner such that continued play will entitle the player to the full interest comp and limited play will entitle the player to receive a corresponding portion of the interest comp.

In essence the above-described embodiments provide a venue-based account that provides "interest" to the player (i.e., a venue-based comp) responsive to the player's maintaining funds in a wagering establishment account or wagering establishment-related account. In such aspect, both the player and the wagering establishment receive a benefit from the arrangement. The "interest" provides a direct benefit to both the player and the wagering establishment, while nurturing player loyalty.

In accord with any of the aspects or embodiments described herein, the comp provided to the player, or the alternative comp available to a player for exchange, or the like, may embody a product or merchandise consistent with the theme of the game(s) played by the player. For example, a player that spent time playing a MONOPOLY-based game and received significant winnings therefrom may be permitted to receive as a comp MONOPOLY-themed merchandise (e.g., clothing, towels, outerwear, games, etc.). The value of the product or merchandise preferably, but not necessarily, bears a correspondence to the player's winnings or the funds desired to be converted or deposited by the player. For a significant jackpot, the player may even be permitted to receive as a comp the gaming terminal upon which the player won the jackpot.

Figure 6:
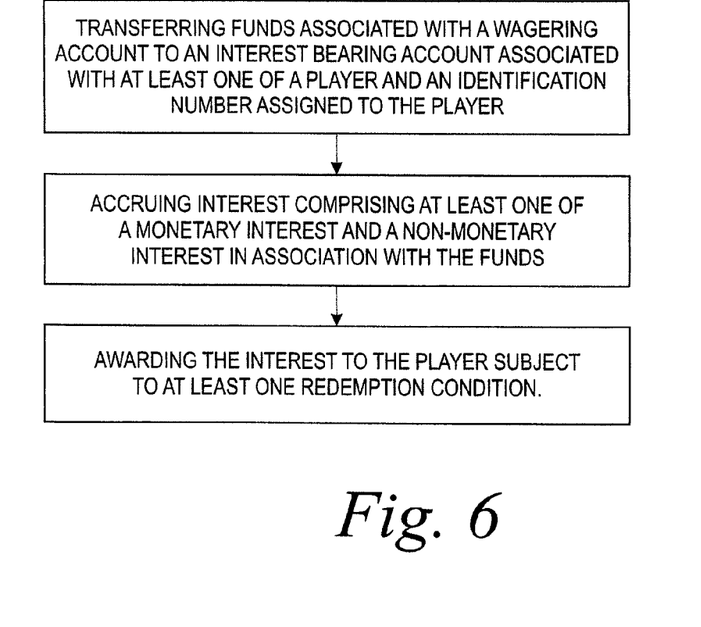
FIG. 6 is another flowchart of a method according to at least some aspects of the present concepts.

FIG. 6 shows an example of the above-noted method of incentivizing deposit of funds to a wagering establishment wagering account. This method includes, in step S600, the step of transferring funds associated with a wagering account to an interest bearing account associated with a player and/or an identification number assigned to the player. The method further includes, in steps S610 and S620, respectively, the steps of accruing interest comprising a monetary interest and/or a non-monetary interest in association with the funds and awarding the interest to the player subject to at least one redemption condition.

Each of these embodiments and obvious variations thereof is contemplated as falling within the spirit and scope of the claimed invention, which is set forth in the following claims. For example, the above concepts are not limited to wagering establishments and may be employed in connection with any establishment, company, service, entity, internet/on-line address(es) or services, or structure. Thus, for example, the concepts expressed herein with respect to a wagering establishment marketplace layer may occur on a non-wagering establishment marketplace layer or, stated differently, a non-wagering marketplace layer. For example, the marketplace layer in accord with the present concepts may comprise an external marketplace layer operated by a third party and the patrons of a gaming establishment may be permitted access to such external marketplace layer (e.g., transfer of assets thereto and receipt of assets therefrom). In another example, the marketplace layer in accord with the present concepts may comprise an external marketplace layer operated by a third party and any individual may access such external marketplace layer to exchange assets. The present concepts further include combinations and/or sub-combinations of the disclosed concepts including, for example, a wagering establishment marketplace layer operatively associated with a non-wagering marketplace layer to permit users to communicate and/or interact therebetween.

What is claimed is:

1. A method of exchanging assets within a wagering establishment computer-based marketplace layer, comprising:

establishing a first wagering layer account for a first participant, said establishing a first wagering layer account including verifying a first set of personal identification data for said first participant and assigning said first participant a first status score, said first status score being indicative of the quantity of data in said first set verified for said first participant, said first wagering layer account having a first anonymous participant ID;

accessing a wagering establishment marketplace layer using a peripheral device;

offering a first asset for exchange in said wagering establishment marketplace layer to all participants in said wagering establishment marketplace layer, said first asset being a non-gameplay related asset issued by said wagering establishment and associated with said first wagering account;

receiving an offer to exchange a second asset for said first asset from a second participant in said wagering establishment marketplace layer, said second participant having an established second wagering layer account including a second anonymous participant ID and a second status score indicative of a quantity of data in a second set of personal identification data verified for said second participant, said second asset being associated with said second wagering layer account;

displaying said second anonymous participant ID, said second status score, and said offer to exchange said second asset for said first asset;

accepting said offer to exchange said second asset for said first asset from said anonymous one of said participants in said wagering establishment marketplace layer; and transferring said first asset in exchange for said second asset by transferring said first asset from said first wagering layer account to said second wagering layer account and transferring said second asset from said second wagering layer account to said first wagering layer account, wherein said first set of personal identification data includes a greater quantity of personal identification data than said second set of personal identification data such that said second status score is indicative of a lower risk than said first status score, said first set of personal identification data including at least credit card information for said first participant, and said second set of personal identification data including at least credit card information and an email address for said second participant.

2. The method of claim 1, wherein said peripheral device comprises at least one of a handheld gaming machine, an upright gaming machine, a kiosk, a handheld electronic device, and a computer.

3. The method of claim 1, wherein said act of accessing comprises establishing a wireless communication link between a server providing access to said wagering establishment marketplace layer and said peripheral device.

4. The method of claim 1, wherein said participants comprises at least one of another player, another person, a computer programmed to conduct trades, and a representative of said wagering establishment.

5. The method of claim 1, wherein at least one of said acts of offering, accepting, and transferring is brokered by said wagering establishment.

6. The method of claim 5, wherein said wagering establishment charges a fee for the act of brokering.

7. The method of claim 1, wherein said first asset is received in association with a wagering activity.

8. The method of claim 1, wherein said second asset comprises at least one of a monetary value, a comp, a game-related asset, an unrealized potential, and a non-game asset, said second asset being different than said first asset.

* * * * *